June 3, 1924.
J. E. KEAN
TROLLEY POLE MOUNTING
Filed Aug. 27, 1923
1,496,646
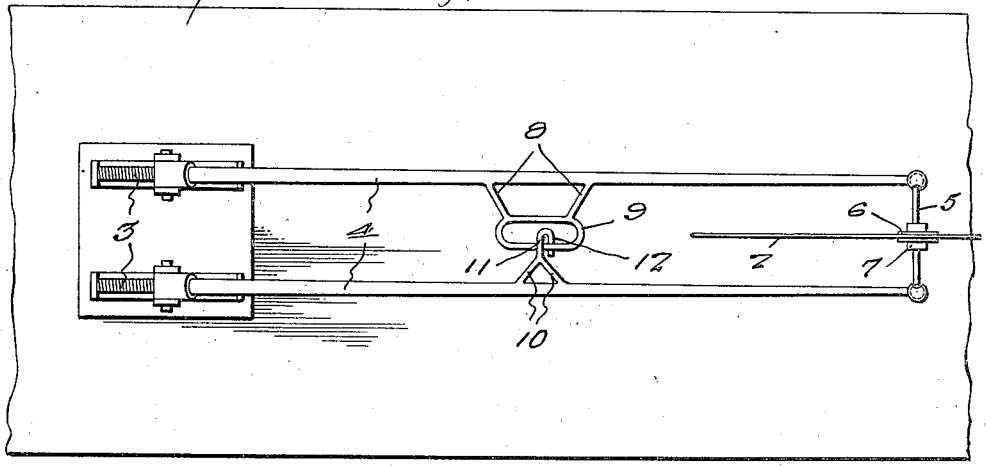
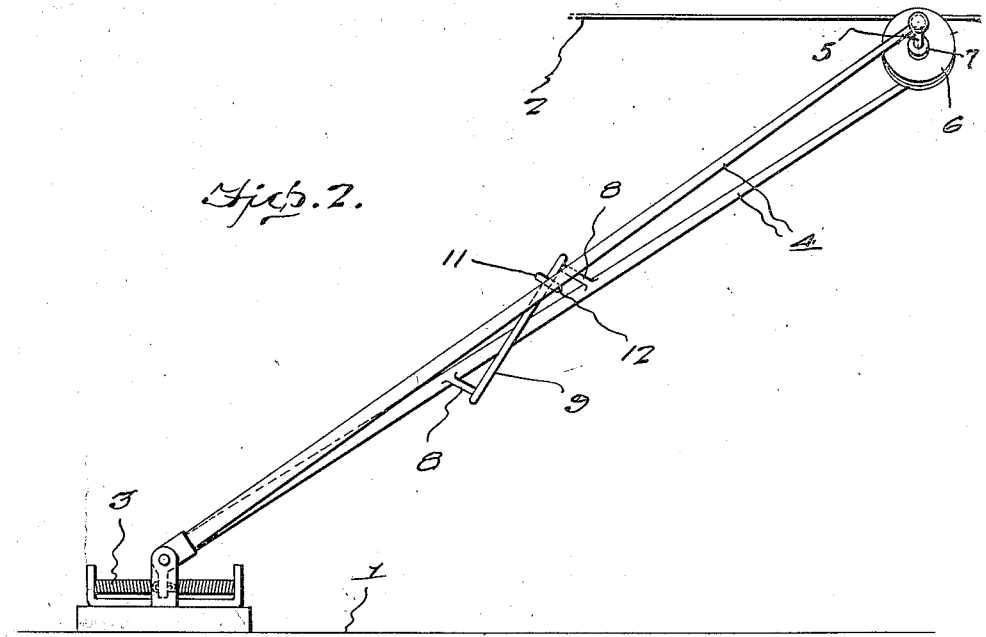
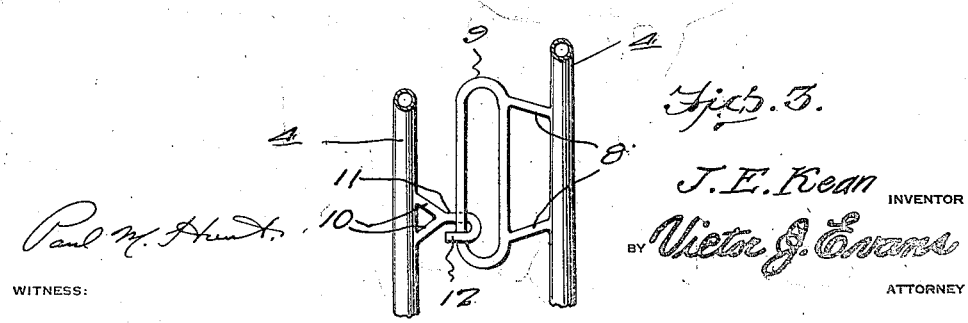

UNITED STATES PATENT OFFICE.

JOSEPH E. KEAN, OF BIRMINGHAM, ALABAMA.

TROLLEY-POLE MOUNTING.

Application filed August 27, 1923. Serial No. 659,687.

*To all whom it may concern:*

Be it known that I, JOSEPH E. KEAN, a citizen of the United States, residing at Birmingham, in the county of Jefferson and State of Alabama, have invented new and useful Improvements in Trolley - Pole Mountings, of which the following is a specification.

The object of this invention is to produce a mount for trolley wheels of the construction which will insure the wheel following the trolley wire regardless of irregularities therein or sharp curves which may be taken by the car.

The invention further consists in the construction, combination and operative association of parts such as is disclosed by the drawings which accompany and which form part of this application.

In the drawings:

Figure 1 is a plan view of the improvement arranged on a trolley car,

Figure 2 is a similar view showing the arrangement of parts when the car rounds a curve or the trolley wheel meets with an irregularity in the trolley wire, Figure 3 is an enlarged detail view of the device.

In the drawings the numeral 1 designates a trolley car of the usual construction, and 2 a trolley wire therefor.

Arranged on the top of a car and with springs 3 there are the normally parallel arms 4 of my improved trolley wheel mount. The arms 4 are connected by a shaft 5 at their upper ends, and thus it will be noted that the mount is of a substantially inverted U-shape construction. However, if desired, the shaft 5 is pivotally secured to the arms 4.

On the shaft 5 there is journaled the trolley wheel 6. Suitable means 7 is provided for preventing a lateral or side movement of the wheel on the shaft, and preferably there are anti-frictional bearings between the said wheel and shaft.

Secured to one of the arms 4 there are inwardly extending angularly disposed rods 8, and connecting the ends of these rods there is a loop 9. On the second arm 4, opposite the rods 8 there are similar rods 10 which have their meeting ends connected and formed with an extension 11 that terminates in a curved or hook-like finger 12 that is received in the loop 8.

The normal position of the mount is as disclosed in Figure 1 of the drawings. The mount assumes the position illustrated in Figure 2 of the drawings when the car rounds a curve or meets with an irregularity in the trolley wire. Under such circumstances it will be noted that the mount assumes an angular position with respect to the car, but the trolley wheel 6 being fixed against longitudinal movement on the shaft will assume a right angular position with respect to the trolley wire, or in other words retain the same position when the said wheel engages with a street trolley wire. It is believed that the foregoing description when taken in connection with the drawings will fully set forth the construction, automatic operation and advantages of the improvement, it being apparent that the springs 3 will influence the mount in all of its positions and that the parallel relation of the arms 4 is maintained by the engagement of the finger 12 with a loop 9.

The support is thrown to either end of the car by the usual cord or cable which obviates the swinging of the usual pivotally supported trolley pole. The improvement is susceptible to such changes as fall within the scope of what I claim.

Having thus described my invention I claim:

A mount for trolley wheels comprising parallel arms arranged over the top of a car, springs supporting the arms on the car, a shaft pivoted to the upper end of the arms, a trolley wheel for engaging a trolley wire journaled on the shaft and held from longitudinal movement thereon, a laterally extending elongated loop carried by one of the arms and a laterally extending hook carried by the other of said arms and slidably engaging the loop.

In testimony whereof I affix my signature.

JOSEPH E. KEAN.